United States Patent [19]

Wang

[11] Patent Number: 5,065,973
[45] Date of Patent: Nov. 19, 1991

[54] SMOOTH SURFACE FIXING SETTER

[76] Inventor: Yeong-Jing Wang, 28-2, Feng-2 Lane, Feng Nian St., Shin Juang City, Taipei Shian, Taiwan

[21] Appl. No.: 618,604
[22] Filed: Dec. 10, 1990
[51] Int. Cl.5 ............................................. F16M 11/00
[52] U.S. Cl. .................................. 248/362; 248/205.8; 248/500; 248/912
[58] Field of Search ...................... 248/362, 363, 205.5, 248/205.6, 205.7, 205.8, 205.9, 467, 912, 206.1-206.4, 500, 346

[56] References Cited

U.S. PATENT DOCUMENTS

| 2,936,139 | 5/1960 | Lindstrom | 248/362 X |
| 2,963,256 | 12/1960 | Borah | 248/362 X |
| 3,904,164 | 9/1975 | Wheeler et al. | 248/362 |
| 4,505,446 | 3/1985 | Röder | 248/205.8 |
| 4,607,875 | 8/1986 | McGirr | 248/362 X |
| 4,844,395 | 7/1989 | Perentin | 248/362 X |
| 4,934,641 | 6/1990 | McElhaney | 248/362 X |
| 4,941,635 | 7/1990 | Lan | 248/362 X |

FOREIGN PATENT DOCUMENTS 835533 5/1960 United Kingdom ................ 248/362

Primary Examiner—Karen J. Chotkowski
Attorney, Agent, or Firm—Bacon & Thomas

[57] ABSTRACT

A setter for supporting a container or other object on a smooth surface, wherein the setter is provided with a suction pad for sticking against the surface and engaged by urging a spring-biased rod downwardly away from a magnetic force attraction. The suction pad is released from the surface by lifting an edge of the pad by a button actuated push block.

1 Claim, 4 Drawing Sheets

SMOOTH SURFACE FIXING SETTER

BACKGROUND OF THE INVENTION

The present invention refers to a smooth surface fixing setter, in particular, one constituted by a body, a suction pad, a transversal shift rod, magnetic iron, a push button, a push block and a plurality of springs to provide the function of allowing the setter to stick on a smooth surface for convenience of setting the objects which fall down easily, and permitting release of the suction by pressing the push button.

There are smooth surfaces everywhere around us in daily life, such as the surfaces of office desk, teapot, kitchen furniture, etc. Most of the wooden appliances with rough surfaces have been replaced by those made with a material having a smooth surface for the purpose of easy cleaning. The liquid cups and bottles used in daily life, containers to be used in laboratories, the ink bottles used in writing and drawing, and painting cans are frequently set on a smooth surface. Because of the smoothness of the surface, the friction force between the bottom of the container and the surface of the appliance on which it is set is reduced greatly. Thus the contents of the container easily spill out, and if they are such substances as liquid foods, drinks or ink, they to stain clothes and documents, and incur irritation. If they are chemicals, such as a toxic chemical, injury to the human body or even disaster may result.

SUMMARY OF THE INVENTION

In daily life, suction pads are used for sticking on the surface of porcelains and glass. For example, a rubber suction pad may to be used in combination with toys, bathing appliances and kitchen furnitures, but it is difficult to stick on level surface for heavy and large objects. On the other hand, both the sticking and pulling off of the rubber suction pad requires considerable pressure or pulling force and often result in being unable to meet the above requirement.

A setter present invention provides the structure to having a stable force suction for sticking on a smooth surface and allowing the setting of various objects which fall down easily and preventing the spillage of their contents.

BRIEF DESCRIPTION OF THE DRAWINGS

This and other objects of the present invention will become apparent upon the study of the following embodiment and drawings of which

DETAILED DESCRIPTION OF THE INVENTION

Figure 1:
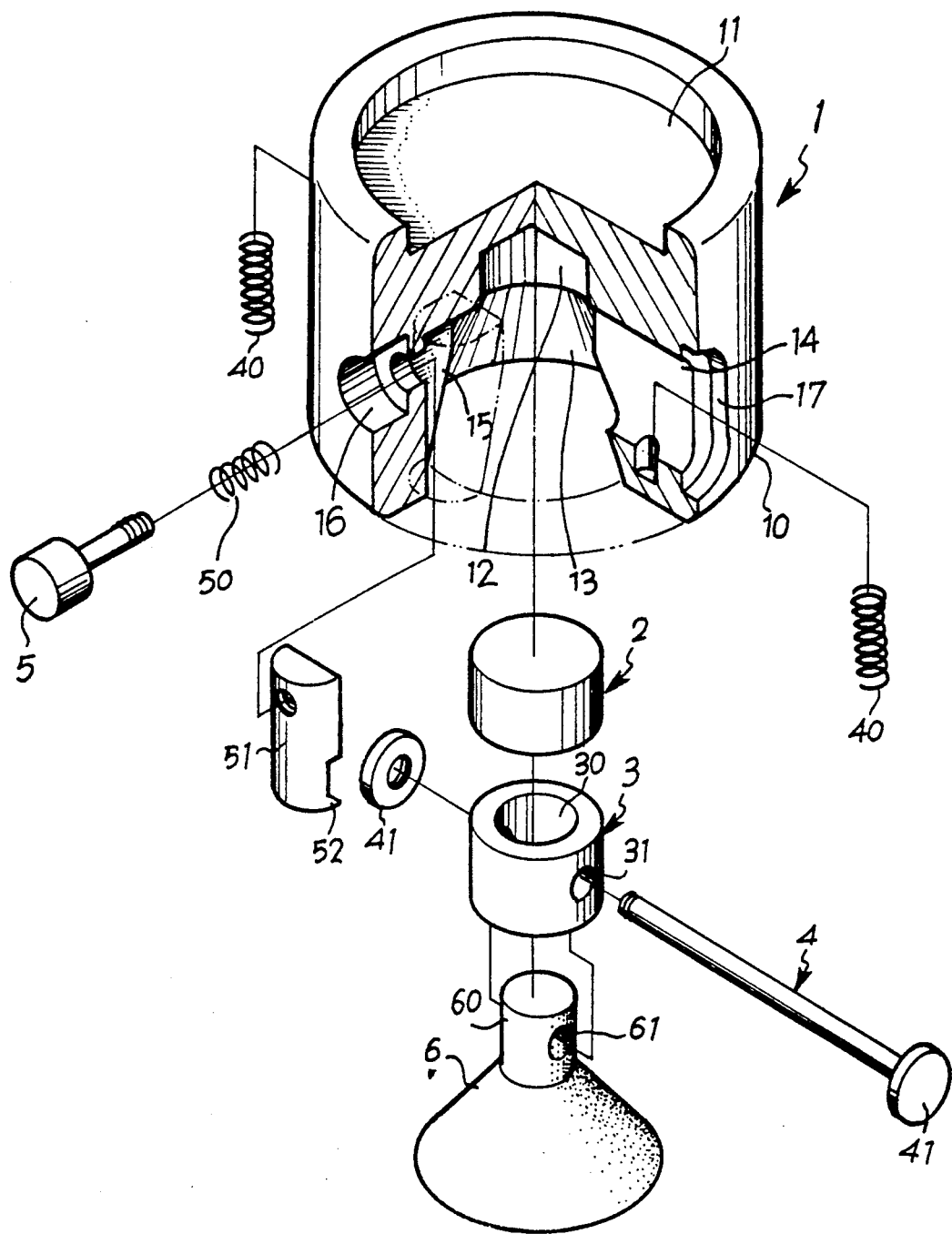
FIG. 1 is an exploded perspective view of the present invention.
Figure 2:
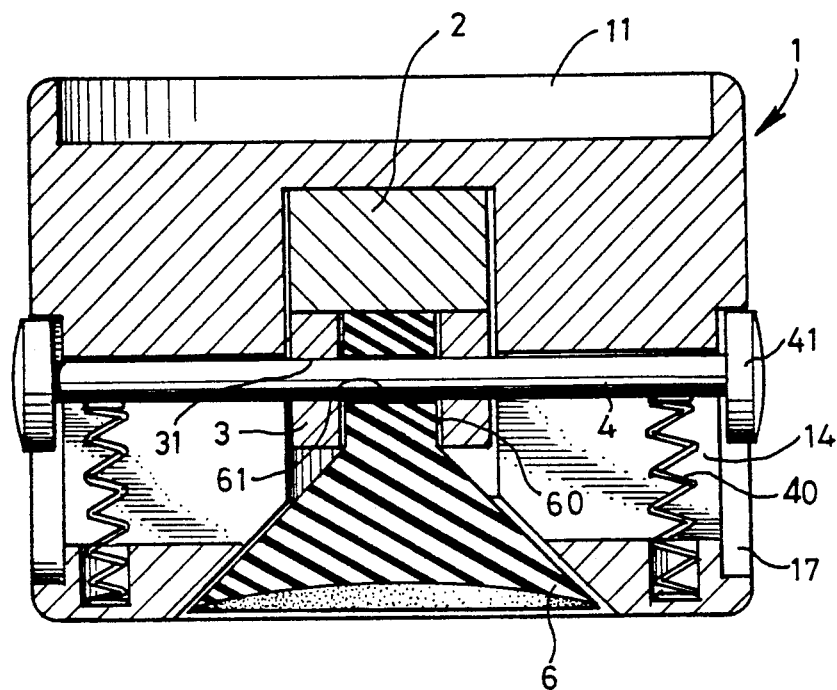
FIG. 2 is the cross sectional view of the present invention.

Referring to FIGS. 1 and 2, the present invention provides generally a body (1), a setter (11) on the body (1) for receiving containers containing liquid or other contents which easily fall down or slip off, a rubber suction pad (6) positioned beneath the body (1) for permitting the bottom (10) of the body (1) to be placed and secured on a smooth surface. There is a blind hole (12) in the center of the bottom (10) of the body (1), the outer portion of the blind hole (12) spreading outward to form a taper hole (13), a transverse groove (14) extending from one side of the body (1) through the center of the blind hole (12) and out the other side of the body (1). There is each a vertical sliding groove (17) on either side of the transverse groove (14), and an oblique hole (16) extending into the center at an angle at the lateral side of the body (1) and connecting a concave path (15) internally.

A magnetic iron 2 is inserted into the blind hole (12).

A tubular chuck (3) having a central hole (30) and a transverse hole (31) extending through the lateral side into the central hole is formed of metallic material which is able to be attached by the magnetic iron.

A transversal shift rod (4) having the same length as the diameter of its body (1) has projecting buttons (41) on the two ends and are engaged two compressing springs (40).

A straight rod extends from a push button (5) and has a small spring (50) to connect with a push block (51) extending at a right angle to the straight rod, and a hook (52) projects forward on the bottom of the push block (51).

A rubber suction pad (6) of circular cone shape includes a projecting rod (60) on the top with a transverse hole (61) extending through the lateral side of the projecting rod (60).

Figure 3:
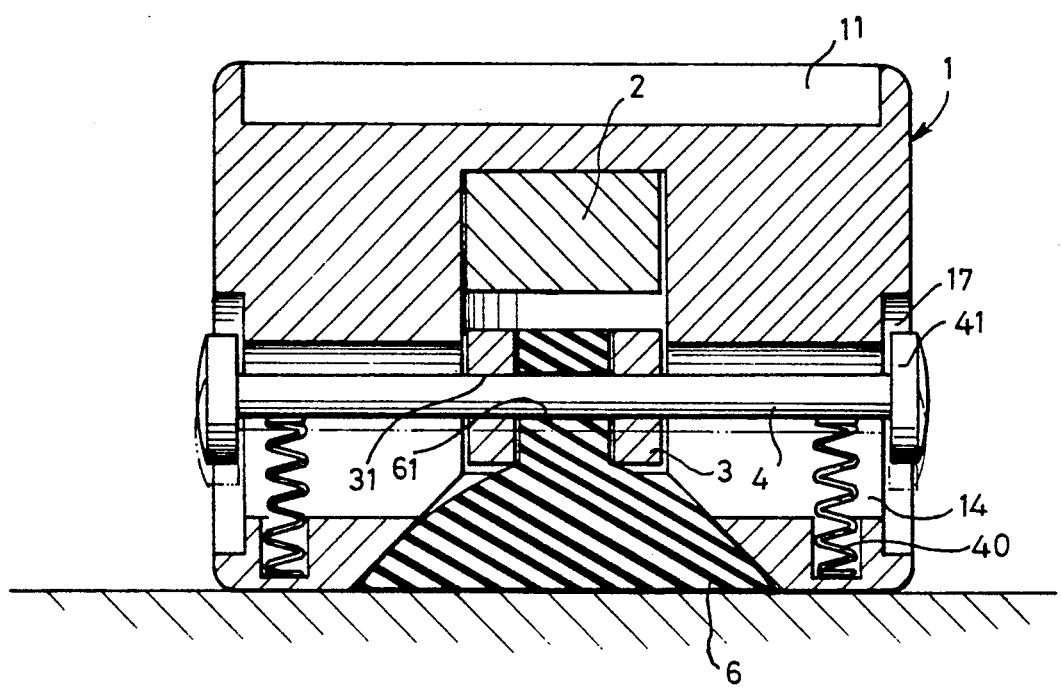
FIG. 3 depicts of the present invention stuck on a smooth surface.

The above-described device operates as follows: As shown in FIG. 3, the magnetic iron (2) is inserted into the blind hole (12) of the body (1). The chuck (3) is encased on the projecting rod (60) of the rubber suction pad (6), both of which are then inserted into the blind hole (12). This positions the circular cone rubber suction pan (6) in the taper hole (13) and allows the transversal shift rod (4) to extend through the transverse groove (14) through the holes (31) (32) to encase the chuck (3) and the rubber suction pad (6) on the transversal shift rod (4). The projecting buttons (41) on the two sides are positioned in the respective sliding grooves (17). The two springs (40) are installed on the bottom of the two sides of the transverse groove (14) and are urged against the transversal shift rod (4).

The push button (5) combining with the small spring (50) joins the push block (51) after extending through the oblique hole (16) and allowing the push block (51) to move in the concave path (15).

As shown in FIG. 3, to stick the present invention on a smooth surface requires touching and pressing two projecting buttons (41) downward with a single hand only. The transversal shift rod (4) will bring the chuck (3) and the projecting rod (60) downwardly to release the attraction of magnetic iron (2). The rubber suction pad (6) will be secured firmly on the smooth surface after releasing of the air in the pad of the two springs (40) against rod (4) after the lessening of the pressure will eliminate the original clearance between body (1) and the rubber suction (6) to enhance the suction force.

Figure 4:
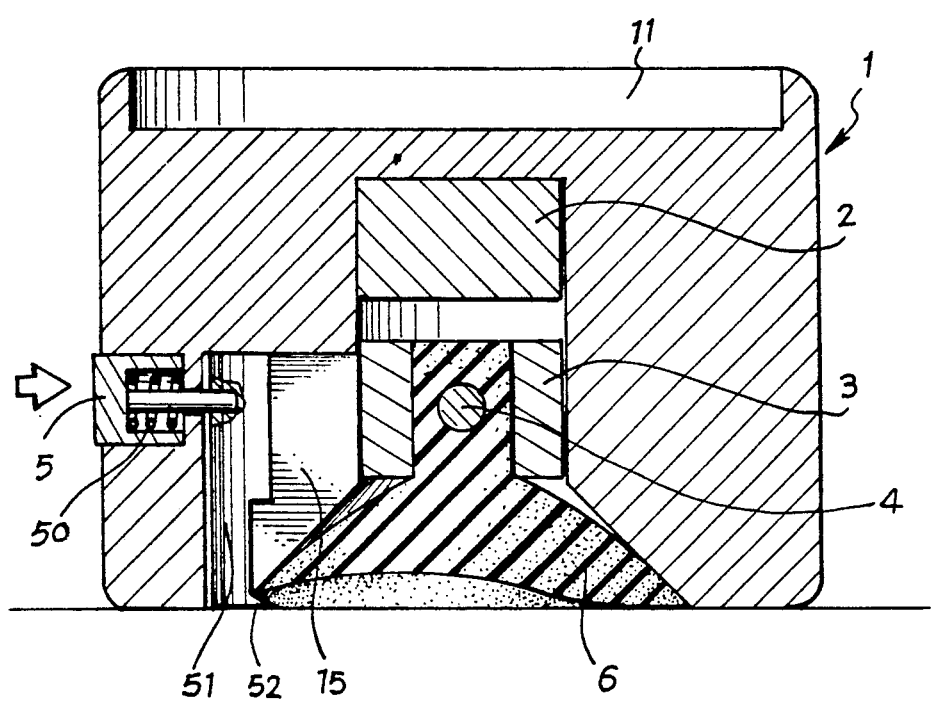
FIG. 4 depicts the present invention released from the smooth surface.

To release pad (6) from the suction of the smooth surface, as shown in FIG. 4, press the push button (5) to cause the push block (51) to move along. The causes concave path (15), the hook (52) on its bottom to be pushed into the edge of the rubber suction pad (6) and cause it to rise to allow air to enter into the suction pad. The transversal shift rod then moves upward quickly because of the upward force of the two springs (40) and the attraction of the magnetic iron (2) to cause the rubber suction pad (6) to release the suction force, and the chuck (3) will be again attracted by the magnetic iron (2).

It will be apparent that the present invention is to utilize the stable bottom (10) of the above body and the matching up of the rubber suction pad (6) to perform the function of fixing objects on a smooth surface. The operation is convenient and quick by utilizing the transversal shift rod (4), push button (5) and related components to maintain the stability of the above body and the object to be fixed on it without exerting direct force on the body (1) or the rubber suction pad (6).

In the present invention as described above, the setter (11) may be designed in the shape of stepped concentric circles to conform to the configuration of the containers and objects in various shapes and sizes.

Of course, other clamping or fitting in of the appliances may also be added to the structure of the present invention for the purpose of other applications, such as setting an electric lamp without the requirement of a heavy base, books ends to be placed on the ends of closely lined up books, etc. Various applicants will be available to combine with different attachments to realize the same function and effect as a conventional setter is able to attain, even on rough surfaces.

Repeated experiments of the samples of the embodiment of the present invention prove that the structure is simple, convenient and practical.

Although the invention is described and illustrated with reference to the foregoing preferred embodiment, it is expressly understood that it is in no way limited to the disclosure of such a preferred embodiment but is capable of numerous modifications within the scope of the appended claims.

I claim:

1. A smooth surface fixing setter comprising an accustomed rubber suction pad combined with a body to be fixed on a smooth surface for firmly holding liquid containers and other objects which easily fall down or slip off the surface, the setter including:

(a) a body having a setter on the top and a blind hole in the center of the bottom with a periphery of the blind hole extending obliquely to form a tapered hole, a transverse groove extending through the body on either side thereof, vertical sliding grooves being provided at the two ends of the transverse groove, and an oblique hole extending from the lateral side of the body at an angle and connecting a concave pad to the blind hole;

(b) a magnetic iron disposed inside the blind hole of the body, a transversal shift rod extending between the transverse grooves, two projecting buttons on the two ends of the shift rod and positioned in the sliding grooves, and the lower end of the shift rod being biased upwardly by two springs;

(c) a circular taper-shaped rubber suction cup having a tubular projecting rod on the top for insertion into a metallic chunk having holes extending through two sides for contacting with a hole extending through the tubular projecting rod of the rubber suction pad and allowing penetration of the transversal shift rod through the blind hole to cause the magnetic iron to magnetically attract the chuck;

(d) a push button having a slender rod extending into the oblique hole of the body, a spring biasing the push button outwardly, a push lock disposed at a right angle to the slender rod and being able to slide in the concave path with its bottom forming a projecting hook; and (e) wherein the smooth surface fixing setter is attached to a smooth surface by pressing the two projecting buttons downwardly to cause the transversal shift rod to separate the rubber suction pad ahd chuck from the magnetic iron and adhering the rubber pad to the smooth surface, and the rubber pad being detachable from the smooth surface by pressing the push button to cause the hook at the bottom of the push block to push the edge of the suction pad, thereby allowing air to enter the suction pad resulting from its losing suction, and the spring pushing upwardly against the transversal shift rod will cause the suction pad to return to its original position in which the chuck and the magnetic iron are affixed to each other through magnetic attraction.

* * * * *